Oct. 5, 1965
A. SALVI 3,210,660
DEVICES FOR MEASURING THE FREQUENCY OF THE OSCILLATIONS
OF AN OSCILLATOR IN PARTICULAR OF A MAGNETIC
RESONANCE MASER OSCILLATOR
Filed June 15, 1962
3 Sheets-Sheet 1
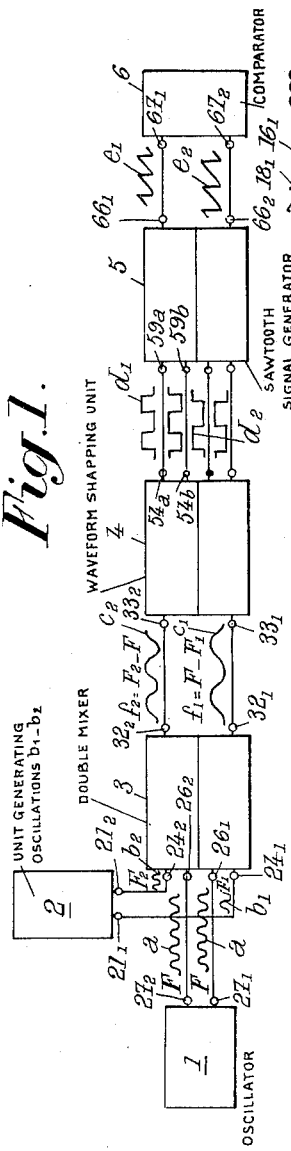
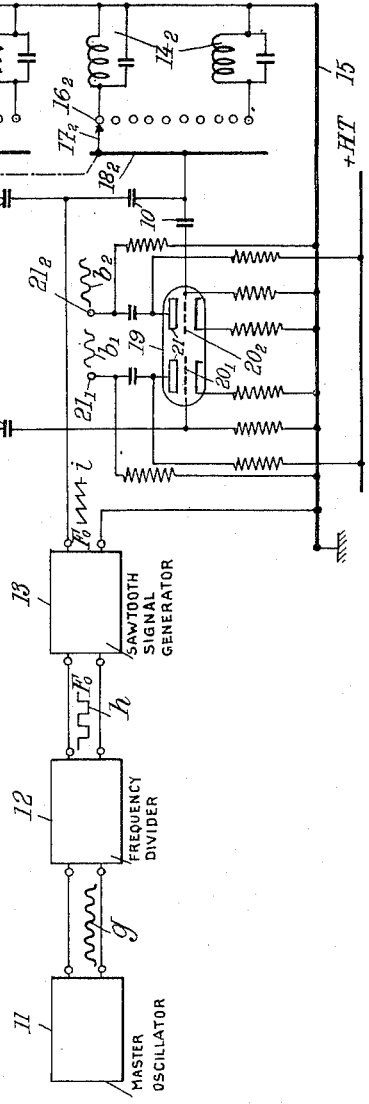

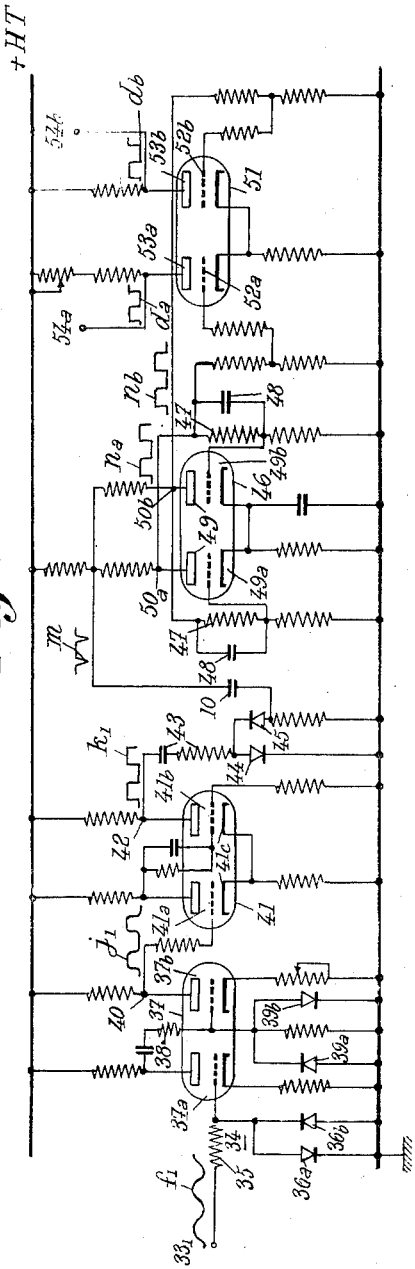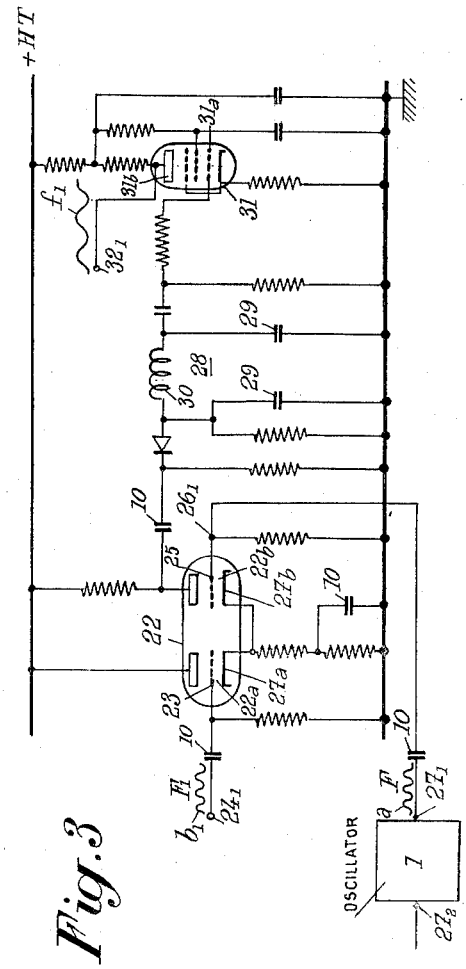
Fig. 4
Fig. 3

United States Patent Office 3,210,660
Patented Oct. 5, 1965

3,210,660
DEVICES FOR MEASURING THE FREQUENCY OF THE OSCILLATIONS OF AN OSCILLATOR, IN PARTICULAR OF A MAGNETIC RESONANCE MASER OSCILLATOR
Antoine Salvi, Fontaine, France, assignor to Commissariat a l'Energie Atomique, Paris, France, an organization of France
Filed June 15, 1962, Ser. No. 202,794
Claims priority, application France, July 12, 1961, 867,822
6 Claims. (Cl. 324—79)

The present invention relates to frequency measuring devices, that is to say to devices intended to measure the frequency of the oscillations generated by an oscillator. The invention is more especially, but not exclusively, concerned with a device for measuring the frequency of the energy emitted by stimulated emission in a magnetic resonance maser oscillator.

The object of this invention is to provide a frequency measuring device having, over those known up to this time, the following advantages: increased precision within the whole range of measurable frequencies, longer time stability, greater safety of operation, smaller time of response, increased range of the measurable frequencies and low cost of manufacture.

A frequency measuring device according to the invention comprises, in combination, the following elements: a unit adapted to generate two oscillations of stable and well determined frequencies, to wit a frequency $F_1$ lower than the frequency F of the sinusoidal oscillations to be measured and a frequency $F_2$ higher than said frequency F; a double-mixer for, on the one hand, frequencies $F_1$ and F and on the other hand, frequencies $F_2$ and F, with selecting means transmitting, at the output of the double-mixer, only beat frequency oscillations, respectively $f_1 = F - F_1$ and $f_2 = F_2 - F$; means for generating signals the amplitude of which has variations substantially proportional to the variations of each of the beat frequencies $f_1$ and $f_2$; and means for measuring the difference between these two signals.

Preferably, the unit capable of generating two stable frequency oscillations comprises a quartz master oscillator generating sinusoidal oscillations of stable frequency, means for generating, from these oscillations saw-tooth signals of stable frequency $F_0$ and means for deducing, from said sawtooth signals, two harmonics of respective frequencies $F_1 = n_1 F_0$ and $F_2 = n_2 F_0$, the difference between $F_1$ and $F_2$ being constant.

The invention is more especially but not exclusively concerned with a refrequency measuring device intended to measure the frequency of the sinusoidal oscillations generated in a magnetic resonance maser oscillator of the type described in the U.S. Patent Nos. 3,049,661 and 3,049,662, both issued August 14, 1962. The principle of this oscillator will be briefly stated hereinafter.

A preferred embodiment of the present invention will be hereinafter described, with reference to the appended drawings given merely by way of example and in which:

FIG. 1 shows in block diagram form a frequency measuring device according to this invention;

FIG. 2 separately shows the unit capable of generating oscillations of stable and well determined frequencies, this element being the same as those shown in FIGS. 3–6 forming one of the parts of the frequency measuring device of FIG. 1;

FIG. 3 shows one of the halves of the double-mixer;

FIG. 4 shows means for shaping the waveforms of the oscillations produced at the output of the double mixer;

Figure 5:
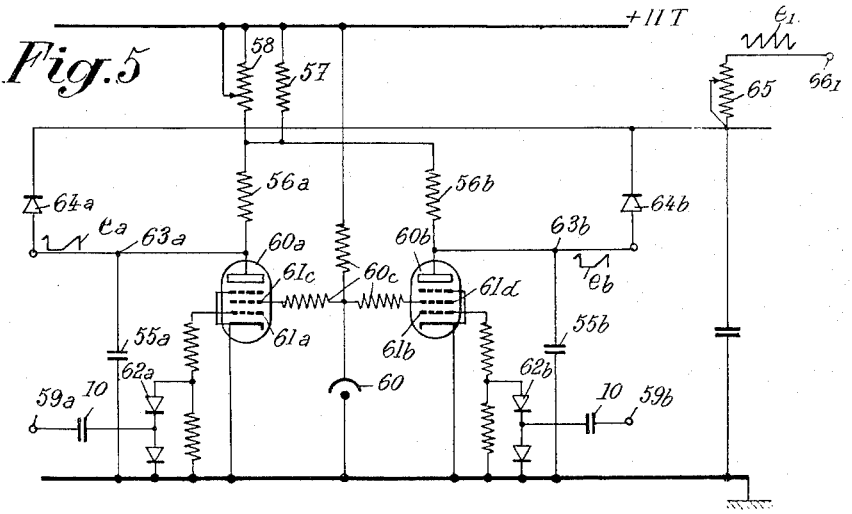
FIG. 5 shows the means for transforming the frequencies of the beat oscillations, such as shaped by the means of FIG. 4, to produce signals the amplitude of which has variations substantially proportional to the variations of each of these frequencies.

A magnetic resonance maser oscillator of the type described in the above mentioned U.S. patents, comprises, disposed in a magnetic field of intensity H (in particular in the earth magnetic field) to be measured, a vessel containing, on the one hand, a solvent with atomic nuclei (in particular protons) having a non-zero well determined gyromagnetic ratio $\gamma_n$ (ratio of magnetic moment to angular momentum), and, on the other hand, dissolved in this solvent a paramagnetic substance (consisting in particular of nitrosodisulfonate ions) having in said field H at least one saturable electronic resonance line, the frequency of this electronic resonance line being different from zero in a magnetic field equal to zero and the coupling between the electrons of said substance and said atomic nuclei being such that saturation of said resonance line produces a stimulated emission of energy at the frequency of nuclear resonance $f$ of said nuclei in the magnetic field of intensity H, means for saturating said electronic resonance line in said magnetic field, and means for collecting the energy emitted by stimulated emission and for sustaining the sinusoidal oscillations of this energy at the frequency of nuclear resonance in field H, this frequency $f$ being exactly proportional to $$H\left(f = \frac{\alpha_n}{2\pi} H\right)$$

Consequently, measurement of frequency $f$ permits of determining the value of intensity H, the precision of the measurement of H being a direct function of the precision of the measurement of $f$, since the coefficient of proportionality $$\frac{\gamma_n}{2\pi}$$

is constant and known with a precision averaging $10^{-5}$.

One of the applications of magnetic resonance maser oscillators is the measurement of variations, in space and in time, of the earth magnetic field, the value of which averages 0.5 oersted or 50,000 gammas (1 gamma being equal to $10^{-5}$ oersted). In a magnetic field of this value, the nuclear resonance frequency for protons is 2,128.8 cycles per second (the gyromagnetic ratio of protons being 26,713).

A frequency meter or device for determining quickly and with a high constant precision the frequency F of the sinusoidal oscillations $a$ of an oscillator 1, in particular the frequency $$f = \frac{\gamma_n}{2\pi} H$$

of a magnetic resonance maser oscillator in a magnetic field of intensity H comprises, in combination, the following elements (FIG. 1);

A unit 2 (illustrated in detailed manner in FIG. 2) capable of generating two oscillations $b_1$, $b_2$ having stable and well determined respective frequencies, to wit a frequency $F_1$ lower than the frequency F of the oscillations $a$ to be measured and a frequency $F_2$ higher than said frequency F;

A double mixer 3 (one half of which is illustrated in detailed manner in FIG. 3) for, on the one hand, frequencies $F_1$ and F and, on the other hand, frequencies $F_2$ and F, with selecting means (consisting advantageously of electric filters) transmitting, at the output of the double-mixer, only beat oscillations $c_1$, $c_2$ of respective frequencies $f_1 = F - F_1$ and $f_2 = F_2 - F$;

Means for generating two signals $e_1$, $e_2$ the amplitude of which has variations substantially proportional to the variations of each of the beat frequencies $f_1$, $f_2$ (in mathematical terms, this proportionality means that the amplitude is a differentiable, and therefore a continuous, function of the frequency, the derivative of the function being in fact the coefficient of proportionality), said means consisting, in the preferred embodiment of this invention, of a double stage 4 (one half of which is illustrated in a detailed manner in FIG. 4) for giving rectangular waveforms $d_1$, $d_2$ to the oscillations of frequencies $f_1$, $f_2$ respectively, and of a double stage 5 (one half of which is illustrated in detailed manner in FIG. 5) for transforming the rectangular signal $d_1$, $d_2$ into saw teeth $e_1$, $e_2$ the maximum amplitude of which is substantially inversely proportional to $f_1$, $f_2$ respectively, the variations of this amplitude being proportional (with a negative coefficient of proportionality) to the variations of frequencies $f_1$ or $f_2$ within a limited range;

And means 6 (illustrated in detailed manner in FIG. 6) to determine the difference between these two signals $e_1$, $e_2$.

In the preferred embodiment of this invention, unit 2 comprises the following elements (FIG. 2):

A quartz master oscillator 11, with its quartz crystal provided with thermostatic means (that is to say comprising, close thereto, and in the known manner, a heating resistor and a bimetallic strip capable of cutting off the flow of heating current through the resistor when the temperature exceeds a given value and restoring this current when the temperature drops below this value) supplying sinusoidal oscillations $g$;

A frequency divider 12 (consisting for instance of an astable or normally free-running multivibrator synchronized by pulses deduced from the preceding oscillations by double clipping and differentiation) which supplies a rectangular signal $h$ of a frequency $F_0$ equal for instance to 42.576 cycles per second;

A generator 13 delivering sawtooth signals $i$ synchronized by rectangular signals $h$, this generator advantageously consisting of a capacitor, adapted to be charged through a resistor from a voltage source and of a tube (triode or pentode) shunting said capacitor and alternately blocked, or non conducting, which permits charging of the capacitor, and conducting, which ensures discharge of the capacitor, by rectangular signals $h$; a type of sawtooth signals generator synchronized by rectangular signals delivered by a multivibrator will be hereinafter described with reference to FIG. 5;

Two series of tuned circuits, for instance two series of ten tuned circuits (only two of which have been shown at $14_1$ and $14_2$ for each series), mounted in parallel (between conductor 15, which is grounded, and two series of contact studs $16_1$ and $16_2$) and tuned to successive harmonics of $F_0$, the circuits of each series being switchable by a double switch $17_1$, $17_2$, two bars $18_1$, $18_2$ connected to the output of generator 13, a contact stud $16_1$ and a contact stud $16_2$, so as to connect a tuned circuit $14_1$ of the first series and the corresponding tuned circuit $14_2$ of the second series (the difference between the order numbers of the harmonics of the two corresponding tuned circuits being constant, for instance equal to 10) to the output of generator 13 in such manner as to select two frequencies $F_1=n_1F_0$ and $F_2=n_2F_0$ ($n_1$ and $n_2$ being the order numbers of the harmonics and $n_2-n_1$ being equal to 10);

A double amplifier consisting of a double triode 19 (fed from the high voltage available on conductor +HT) mounted to amplify the oscillations of frequencies $F_1$ and $F_2$ (selected by the oscillating circuits that are actually branched) applied on grids $20_1$, $20_2$; the amplified oscillations $b_1$ (of frequency $F_1$) and $b_2$ (of frequency $F_2$) which appear at anodes 21 are available at $21_1$, $21_2$; capacitors 10 eliminate the direct current components.

It will be noted that the harmonics of the sawtooth signals $i$ are selected in view of the fact that perfect saw teeth in the form of right-angled triangles can be developed in a Fourier series of the form:

$$\frac{a_0}{2}+\frac{a_0}{\pi}\left[\frac{\sin wt}{1}-\frac{\sin 2wt}{2}+\frac{\sin 3wt}{3}\cdots\right]$$

in which $a_0$ is the maximum amplitude of the saw teeth and $w=2\pi f_0$ is the angular frequency of the saw teeth, when the base of the saw teeth is taken as the axis of abscissas and a vertical passing through the middle of a saw tooth is taken as the axis of ordinates. Consequently, perfect saw teeth comprise harmonics of angular frequencies $2w$, $3w$ ... having with respect to the fundamental angular frequency an attenuation inversely proportional to their order number.

Every half of the double mixer 3, with the selecting means combined therewith, is made as shown by FIG. 3 and comprises the following elements:

A double triode 22 (which is also fed with current from the high voltage line +HT); the first grid 23 of this triode receives signal $b_1$, of frequency $F_1$, for the half shown by FIG. 3 (for the other half of the double mirer, the first grid of the triode receives signal $b_2$, of frequency $F_2$), this signal being impressed on the input $24_1$ of the triode, which input is directly connected to the output $21_1$ of unit 2 (for the other half of the double mixer signal $b_2$ is impressed directly on the input $24_2$, FIG. 1, directly connected to the output $21_2$ of unit 2); the other grid 25 of triode 22 receives signal $a$, of frequency $F$, impressed on the input $26_1$ connected to the output $27_1$ of oscillator 1, the other output $27_2$ of which is connected to the input $26_2$ of the second half of the double mixer 3 (not shown in FIG. 3); the first stage 22a of double triode 22 is mounted as a cathode-follower amplifier whereas the second stage 22b serves to mix frequency $F_1$, applied on its cathode 27b through stage 22a due to the interconnection of the cathodes 27a, 27b of the two stages, with the frequency $F$ applied on its grid 25 (the second half of the double mixer serves to mix in a likewise manner frequencies $F_2$ and $F$); capacitors 10 eliminate the direct current components;

A pi filter 28, comprising capacitors 29 and an inductance 30, which transmits only frequency $f_1=F-F_1$, for the first half of the double mixer (for the second half of this mixer the frequency that is allowed to pass is $f_2=F_2-F$); as a matter of fact, since $F$ has a value comprised between those of $F_2$ and $F_1$, $f_1$ and $f_2$ are smaller than $F_2-F_1$; therefore filter 28 is a low-pass filter which permits only the passage of frequencies smaller than $dF=F_2-F_1$, which difference is constant for the different positions of switch 17 (for the values taken by way of example $dF=425.76$ cycles per second since $n_2-n_1=10$);

An amplifier comprising of a pentode 31 the control grid 31a of which receives the filtered oscillations and delivers, on its anode 31b, oscillations amplified in such manner as to deliver, at $32_1$ (or $32_2$), oscillations of frequency $f_1$ (or $f_2$) of an amplitude sufficient to permit of transforming them into substantially rectangular signals in the clippers or peak limiters of the shaping unit 4.

For every train of amplified beat oscillations of frequency $f_1$ of $f_2$ the shaping unit comprises (FIG. 4):

A first limiter (or double clipper) 34, comprising a resistor 35 and two diodes 36a, 36b disposed in opposed directions so as to limit the oscillations $f_1$ arriving at $33_1$ (or $33_2$) both on the side of the positive amplitudes and on that of the negative amplitudes;

A first amplifier stage 37a consisting of the first half of a double triode 37 (fed with current from the high voltage line +HT);

A second limiter stage (or double clipper) comprising a resistor 38 and two diodes 39a, 39b disposed in opposed directions for the same reason as for diodes 36a and 36b;

A second amplifier stage 37b consisting of the second half of double triode 37, the succession of double clippings (or limitations) and amplifications producing substantially rectangular signals $j_1$ of frequency $f_1$ (or $j_2$ of frequency $f_2$) available at 40;

A Schmitt circuit 41, that is to say a bistable multivibrator comprising two triodes, or a double triode 41a, 41b, coupled by cathodes 41c, which constitutes a shaping circuit transforming substantially rectangular signals $j_1$ into perfectly rectangular signals $k_1$, of the same frequency, available at its output 42;

A differentiating circuit 43 giving pairs of positive and negative pulses;

A selector of negative pulses comprising a diode 44 which permits the positive pulses to pass to the ground, and a diode 45 through which pass only the negative pulses and which delivers negative pulses $m$ at frequency $f_1$ (or $f_2$);

A selector of negative pulses comprising a diode 44 which permits the positive pulses to pass to the ground, and a diode 45 through which pass only the negative pulses and which delivers these negative pulses $m$ at frequency $f_1$ (or $f_2$);

A bistable multivibrator of the Eccles-Jordan type, that is to say comprising a double triode 46 with resistance coupling (with a capacitor 48 in shunt to accelerate triggering), triggered by the negative pulses $m$ applied on the two anodes 49 of the halves 49a and 49b and delivering at its outputs 50a and 50b complementary rectangular signals $na$ and $nb$ the durations of which are equal to $1/f_1$ (or $1/f_2$) this multivibrator serving, among other things, to correct the disymmetries which may have been produced by the Schmitt circuit;

A double amplifier consisting of a double triode 5 receiving on its grids 52a, 52b the rectangular signals $na$, $nb$ and delivering at its anodes 53a, 53b rectangular signals $da$, $db$ of sufficient amplitude (averaging 120 volts) to operate the switches of the next stage 5, which transforms these rectangular signals, available at terminals 54a, 54b, into saw teeth.

Each of the halves of unit 5 comprises, as shown by FIG. 5, for each of the signals $da$, $db$ (designated by $d_1$ in FIG. 1, whereas the corresponding signals for the other half are designated by $d_2$):

A capacitor 55a, 55b, adapted to be charged from the stabilized high voltage feed line +HT (which has already been mentioned with reference to FIGS. 2, 3 and 4) through a fixed resistor 56a, 56b and a system comprising a fixed resistor 57 and an adjustable resistor 58 mounted in shunt with respect to each other;

An input 59a, 59b directly connected to the corresponding output 54a, 54b of the preceding stage, to receive signals $da$, $db$;

A pentode 60a, 60b the control grid of which, 61a, 61b, receives from the input 59a, 59b (and through diode 62a, 62b) the negative rectangular signals $da$, $db$ which block it below the cut off voltage.

With such an arrangement pentodes 60a, 60b are alternately non-conducting and conducting, one of them being non-conducting while the other is conducting. During the time pentode 60a is non-conducting, capacitor 55a is charged, as a function of time $e$, according to the law:

$$V = V_0(1 - e^{-t/CR})$$

in which

V is the voltage across the terminals of capacitor 55a,
$V_0$ is the stabilized high voltage,
C is the capacitance of capacitor 55a, and
R is the resistance of system 56a, 57, 58.

At the end of the negative voltage signal $da$ applied on control grid 61a, pentode 60a becomes conducting and capacitor 55a discharges through this pentode. If the duration $$t_1 = \frac{1}{f_1}$$

of voltage signal $da$ is small as compared with the time constant CR, the charging of capacitor 55a is substantially linear and substantially triangular saw teeth $ea$ are obtained at 63a, the maximum amplitude of which is substantially proportional to $t_1$ and therefore to $1/f_1$. In a likewise manner substantially triangular saw teeth $eb$ are obtained at 63b; their maximum amplitude being proportional to $$t_1 = \frac{1}{f_1}$$

and their phase shift with respect to saw teeth $ea$ being of $t_1$.

Saw teeth $e_a$, $e_b$ are detected and mixed in an OR-circuit consisting of two silicon diodes 64a and 64b and a sawtooth voltage $e_1$ is obtained, the maximum amplitude of which is substantially proportional to $$t_1 = \frac{1}{f_1}$$

a potentiometer 65 making it possible to adjust the level of this amplitude available at $66_1$.

Balancing of pentodes 60a and 60b is ensured by means of a glow lamp 60 and of a resistor bridge 60c connected between the high voltage, the ground and the screen grids 61c.

A second channel, comprising units analogous to those illustrated by FIGS. 3, 4 and 5 delivers, at an output $66_2$, saw teeth $e_2$ the maximum amplitude of which is proportional to $$t_2 = \frac{1}{f_2}$$

If $E_1$ and $E_2$ are the maximum amplitudes of $e_1$ and $e_2$ respectively and if $K_1$ and $K_2$ are positive constants, then $$E_1 = \frac{K_1}{f_1}$$

and $$E_2 = \frac{K_2}{f_2}$$

By differentiating and if $dE_1$, $dE_2$, $df_1$ and $df_2$ are the elementary variations of $E_1$, $E_2$, $f_1$ and $f_2$ respectively, then $$dE_1 = -\frac{K_1}{f_1^2}df_1$$

and $$dE_2 = -\frac{K_2}{f_2^2}df_2$$

Therefore the variations of amplitude of signals $e_1$ and $e_2$ are proportional (the coefficient of proportionality being negative) to the variations of the beat (frequencies $f_1$ and $f_2$, respectively, within a small range.

Figure 6:
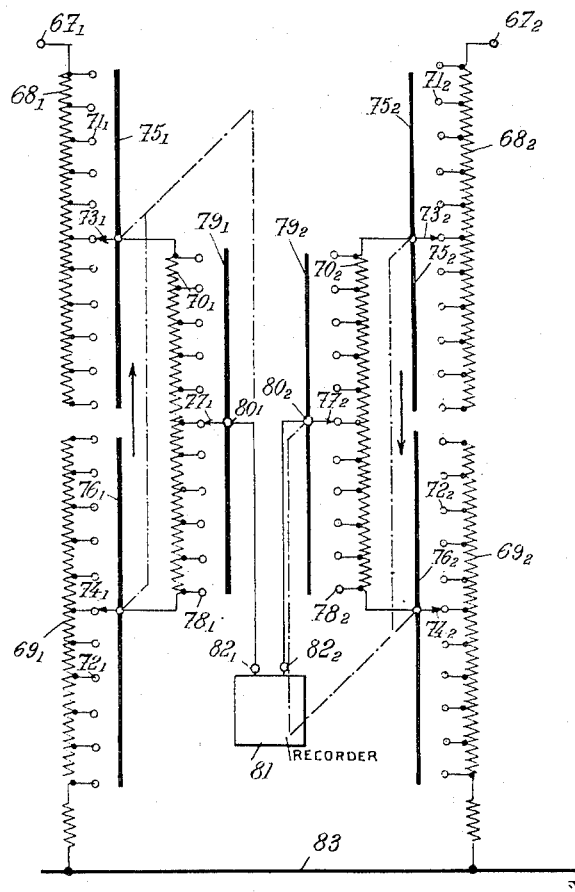
FIG. 6 shows the means for comparing the signal delivered by the means of FIG. 5 with a similar signal.

Comparison between saw teeth $e_1$ and saw teeth $e_2$ is performed in comparator 6 which may for instance be of the type including calibrated resistor chains (or linear networks), as illustrated in FIG. 6 and the two inputs $67_1$ and $67_2$ of which are connected respectively with the outputs $66_1$ and $66_2$ of the two stages for the formation of triangles $e_1$ and $e_2$. Of course, if the amplitudes of $e_1$ and $e_2$ are equal, $F_2 - F = F - F_1$, that is to say $$F = \frac{F_1 + F_2}{2}$$

In the contrary case, the resistor chains $68_1$, $69_1$ and $70_1$ on the one hand, and $68_2$, $69_2$ and $70_2$ on the other hand, which are calibrated resistors of high stability, permit of determining the value of F within the interval $F_2 - F_1$.

Resistor chains $68_1$, $69_1$, $68_2$, $69_2$ (connected respectively to $67_1$, to the ground 83, to $67_2$ and to the ground 83) comprise eleven resistors identical to one another, of for instance 1000 ohms. A slider switch $73_1$, $74_1$ on the one hand and $73_2$ and $74_2$ on the other hand selects two corresponding contact studs $71_1$, $72_1$ in chains $68_1$, $69_1$ on the one hand and two corresponding contact studs $71_2$, $72_2$ in chains $68_2$, $69_2$ on the other hand bringing opposite these contact studs, elements $73_1$, $74_1$, $73_2$, $74_2$ mounted slidably on bars $75_1$, $76_1$, $75_2$, $76_2$ (these two sliding elements are illustrated in their neutral positions).

In an analogous manner, resistor chains $70_1$, $70_2$ (disposed between terminals $75_1$ and $76_1$ or $75_2$ and $76_2$) each comprise eleven resistors identical to one another and having a value equal to one tenth of that of resistors 68, 69 (for instance a value of 100 ohms). Sliding members $77_1$, $77_2$ (also shown in neutral position) permit of choosing one of the eleven contact studs $78_1$, $78_2$, by sliding of these elements along bars $79_1$, $79_2$. Displacement of sliding elements 73, 74 on the one hand and 77 on the other hand from their neutral positions permit of reducing in a given ratio the difference between the amplitudes of $e_1$ and $e_2$ if this difference is not zero.

Owing to these resistor chains and these sliding elements the potential difference between points $80_1$ and $80_2$ on bars $79_1$ and $79_2$ is a given fraction of the potential difference between $67_1$ and $67_2$. In the zero position illustrated by the drawing, the ratio is not modified it is equal to 1) but every displacement of sliding elements 73, 74 from a contact stud 71, 72 corresponds to a given variation of the frequency, which may be made to correspond for instance to 100 gammas, which corresponds to 1000 gammas for the complete scale that is to say for the whole width of range $F_2-F_1$. In a likewise manner, the two resistor chains 70 permit a direct calibrating from 10 to 10 gammas. This is possible due to the proportionality existing between the variations of amplitudes $E_1$ (or $E_2$) and the variations of frequency $f_1$ (or $f_2$), this proportionality resulting from the fact that this ampltiude expressed as a function of the frequency upon which it depends can be differentiated.

Finally, a recorder 81, of the differential galvanometer type, having two inputs $82_1$, $82_2$, permits of terminating the reading with an approximation of 1 gamma in the 10 gamma band selected by resistor chains 68, 69, 70.

A frequency meter made according to the present invention has the following advantages:

It permits of determining, very quickly and with a high accuracy, the frequency of the oscillations of an oscillator, in particular of a magnetic resonance maser oscillator.

Its precision is constant, both within the range of measurable frequencies and in the course of time.

With such a frequency meter it is possible very quickly to determine the frequency of the oscillations within a wide frequency range.

When measuring the oscillations of a magnetic resonance maser oscillator intended to give the intensity of a magnetic field (in particular of the earth magnetic field) it permits of quickly determining the oscillation frequencies in values of the magnetic field, indicated for instance in gammas.

It permits of determining the frequency of oscillation close to 2 megacycles per second with a time of response averaging 0.1 second, which permits a practically instantaneous recording of the variations of the frequency and, consequently of the intensity of the magnetic field in the case of a maser oscillator adapted for the measurement of this field.

In a general manner, while the above description relates to a particularly advantageous embodiment of the invention, the example above described has no limitative character.

What I claim is:

1. A device for measuring the frequency of the sinusoidal oscillations generated by an oscillator, which comprises, in combination, a unit adapted to generate two oscillations of stable and well determined frequencies, to wit a frequency $F_1$ lower than the frequency $F$ of the oscillations to be measured and a frequency $F_2$ higher than said frequency $F$; a double-mixer for, on the one hand, frequencies $F_1$ and $F$ and on the other hand, frequencies $F_2$ and $F$, including selecting means for transmitting, at the output of the double-mixer, only beat frequency oscillations, respectively $f_1=F-F_1$ and $f_2=F_2-F$; means for generating signals the amplitude of which has variations substantially proportional to the variations of each of the beat frequencies $f_1$ and $f_2$; and means for measuring the amplitude difference between these two last mentioned signals.

2. A device according to claim 1 wherein the unit capable of generating two stable frequency oscillations comprises a quartz maser oscillator capable of generating sinusoidal oscillations of stable frequency, means for generating, from said sinusoidal oscillations, sawtooth signals of stable frequency $F_0$ and means for deducing, from said sawtooth signals, two harmonics of respective frequencies $F_1=n_1F_0$ and $F_2=n_2F_0$, $n_1$ and $n_2$ being integers and the difference between $F_1$ and $F_2$ being constant.

3. A device according to claim 2 wherein said means for deducing said two harmonics of respective frequencies $F_1$ and $F_2$ comprise two series of circuits tuned to successive harmonics of $F_0$ and means for switching on the outputs of the means for generating the sawtooth signals, two of said tuned circuits corresponding to harmonics the respective order numbers of which differ from each other by a constant value.

4. A device according to claim 1 wherein said means for generating signals the amplitude of which has variations substantially proportional to the variations of the beat frequency oscillations of respective frequencies $f_1$ and $f_2$ comprise: means for generating, from said beat frequency oscillations, two sequences of signals having, at any time, one a first constant signal value and the other a second contant signal value, these values being exchanged on every beat half-period; means for generating, from each of said sequences of signals, a sawtooth signal increasing with a constant slope when the signal of the corresponding sequence has said first value and constant for the remainder of the time; and means for mixing said two sawtooth signals to give, for each of said sequences of signals, a signal the amplitude of which has variations substantially proportional to the variations of the beat frequency.

5. A device according to claim 1 wherein said means for measuring the amplitude difference between the two signals the amplitude of which has variations substantially proportional to the variations of the respective beat frequency comprise two series of high stability resistors of calibrated respective resistances, adapted to reduce in a given ratio the difference between the frequencies of the beat oscillations, and means for recording this reduced difference between frequencies $f_1$ and $f_2$.

6. A device for determining the frequency of sinusoidal oscillations generated in a magnetic resonance magnetometer by stimulated emission of energy, which comprises, in combination, a unit adapted to generate two oscillations of stable and well determined frequencies, to wit a frequency $F_1$ lower than the frequency $F$ of the oscillations to be measured and a frequency $F_2$ higher than said frequency $F$; a double-mixer for, on the one hand, frequencies $F_1$ and $F$ and on the other hand, frequencies $F_2$ and $F$, including selecting means for transmitting, at the output of the double-mixer only beat frequency oscillations, respectively $f_1=F-F_1$ and $f_2=F_2-F$; means for generating signals the amplitude of which has variations substantially proportional to the variations of each of the beat frequencies $f_1$ and $f_2$; and means for measuring the amplitude difference between these two last mentioned signals, said last mentioned means comprising two series of high stability resistors of calibrated respective resistances, adapted to reduce in a given ratio the difference between the frequencies of the beat oscillations, and means for recording this reduced difference between frequencies $f_1$ and $f_2$, said chain of resistors and said recording means being calibrated directly in magnetic field intensity units.

References Cited by the Examiner

UNITED STATES PATENTS

| | | | |
|---|---|---|---|
| 2,438,801 | 3/48 | Braden | 324—79 X |
| 2,558,100 | 6/51 | Rambo | 324—79 X |
| 2,714,663 | 8/55 | Norton | 324—79 X |
| 2,919,403 | 12/59 | Buntenbach | 324—79 |

FOREIGN PATENTS 1,031,417  6/58  Germany.

WALTER L. CARLSON, *Primary Examiner.*